(12) United States Patent
Collins-Elder et al.

(10) Patent No.: US 11,222,612 B2
(45) Date of Patent: Jan. 11, 2022

(54) AUGMENTED REALITY BASED VIRTUAL DASHBOARD IMPLEMENTATIONS

(71) Applicant: Hewlett-Packard Development Company, L.P., Spring, TX (US)

(72) Inventors: Dimitri Collins-Elder, Fort Collins, CO (US); David H. Hanes, Fort Collins, CO (US); Jordan White, Fort Collins, CO (US); Danielle Saldanha, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/650,000

(22) PCT Filed: Nov. 30, 2017

(86) PCT No.: PCT/US2017/064044
§ 371 (c)(1),
(2) Date: Mar. 24, 2020

(87) PCT Pub. No.: WO2019/108211
PCT Pub. Date: Jun. 6, 2019

(65) Prior Publication Data
US 2020/0286443 A1 Sep. 10, 2020

(51) Int. Cl.
*G09G 5/00* (2006.01)
*G06F 3/0488* (2013.01)
(Continued)

(52) U.S. Cl.
CPC ............. *G09G 5/006* (2013.01); *G06F 3/013* (2013.01); *G06F 3/04883* (2013.01);
(Continued)

(58) Field of Classification Search
CPC .. G09G 5/006; G09G 5/32; G09G 2320/0261; G09G 2320/028; G06F 3/013;
(Continued)

(56) References Cited

U.S. PATENT DOCUMENTS 6,005,573 A 12/1999 Beyda et al.
9,497,501 B2 11/2016 Mount et al.
(Continued)

FOREIGN PATENT DOCUMENTS

WO WO-2016051366 A2 4/2016
WO WO-2017106072 A2 6/2017

OTHER PUBLICATIONS

The Promise of Augmented Reality, Feb. 4, 2017, https://www.economist.com/news/science-and-technology/21716013-replacing-real-world-virtual-one-neat-trick-combining-two.

*Primary Examiner* — Bryan Earles
(74) *Attorney, Agent, or Firm* — Mannava & Kang

(57) ABSTRACT

In some examples, with respect to augmented reality based virtual dashboard implementation, features of a physical computer system display may be identified. Based on the identified features of the physical computer system display, boundaries of a virtual dashboard may be determined. Based on the determined boundaries of the virtual dashboard, an augmented reality display may be generated for an augmented reality device. The augmented reality display may include a view of the physical computer system display and may further include a virtual reality display of the virtual dashboard adjacent to and outside of the identified features of the physical computer system display. The virtual dashboard may include content displayed thereon.

12 Claims, 6 Drawing Sheets

(51) Int. Cl.
   *G06F 3/01* (2006.01)
   *G06T 19/00* (2011.01)
   *G09G 5/32* (2006.01)

(52) U.S. Cl.
   CPC ............ *G06T 19/006* (2013.01); *G09G 5/32* (2013.01); *G09G 2320/028* (2013.01); *G09G 2320/0261* (2013.01)

(58) Field of Classification Search
   CPC ................ G06F 3/04883; G06F 3/147; G06F 2203/04803; G06F 3/0481; G06F 9/451; G06F 3/011; G06T 19/006; G06K 9/00671
   See application file for complete search history.

(56) References Cited

U.S. PATENT DOCUMENTS

| | | | |
|---|---|---|---|
| 10,379,345 B2* | 8/2019 | Mullins | G06T 19/006 |
| 2006/0076908 A1 | 4/2006 | Morgan et al. | |
| 2012/0127284 A1 | 5/2012 | Bar-Zeev et al. | |
| 2013/0249791 A1* | 9/2013 | Pryor | G06F 17/00 345/156 |
| 2014/0002444 A1 | 1/2014 | Bennett et al. | |
| 2014/0253590 A1 | 9/2014 | Needham et al. | |
| 2016/0203639 A1 | 7/2016 | Bostick et al. | |

\* cited by examiner

500

IDENTIFY FEATURES OF A PHYSICAL COMPUTER SYSTEM DISPLAY
502

DETERMINE, BASED ON THE IDENTIFIED FEATURES OF THE PHYSICAL COMPUTER SYSTEM DISPLAY, BOUNDARIES OF A VIRTUAL DASHBOARD
504

GENERATE, FOR AN AUGMENTED REALITY DEVICE AND BASED ON THE DETERMINED BOUNDARIES OF THE VIRTUAL DASHBOARD, AN AUGMENTED REALITY DISPLAY THAT INCLUDES A VIEW OF THE PHYSICAL COMPUTER SYSTEM DISPLAY, A VIRTUAL REALITY DISPLAY OF THE VIRTUAL DASHBOARD ADJACENT TO AND OUTSIDE OF THE IDENTIFIED FEATURES OF THE PHYSICAL COMPUTER SYSTEM DISPLAY, AND A FURTHER VIRTUAL REALITY DISPLAY OF A VIRTUAL MONITOR ADJACENT TO THE PHYSICAL COMPUTER SYSTEM DISPLAY
506

*FIG. 5*

AUGMENTED REALITY BASED VIRTUAL DASHBOARD IMPLEMENTATIONS

BACKGROUND

A computer system display may include a monitor or another type of device that is used to display information. The computer system display may include a display screen, electronic circuitry, a housing, and a power supply unit (PSU). An example of a computer system display includes a thin film transistor liquid crystal display (TFT-LCD) with light-emitting diode (LED) backlighting. The display screen may define the maximum dimensions of a display area that may be used to display content.

BRIEF DESCRIPTION OF DRAWINGS

Features of the present disclosure are illustrated by way of example and not limited in the following figure(s), in which like numerals indicate like elements, in which:

FIG. 5 illustrates an example flowchart of a method for augmented reality based virtual dashboard implementation.

DETAILED DESCRIPTION

Figure 1:
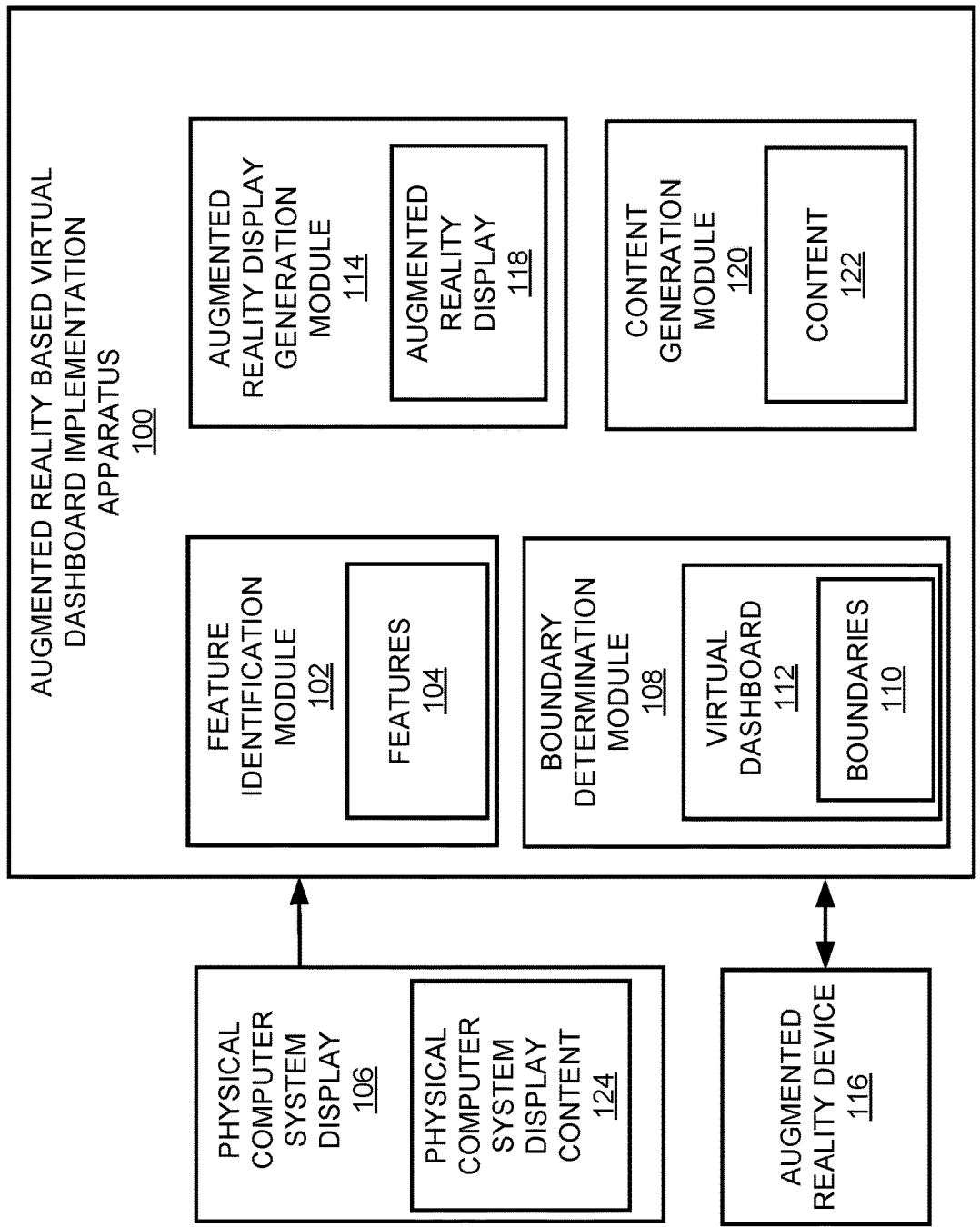
FIG. 1 illustrates an example layout of an augmented reality based virtual dashboard implementation apparatus, and associated components.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Augmented reality based virtual dashboard implementation apparatuses, methods for augmented reality based virtual dashboard implementation, and non-transitory computer readable media having stored thereon machine readable instructions to provide an augmented reality based virtual dashboard implementation are disclosed herein. The apparatuses, methods, and non-transitory computer readable media disclosed herein provide for generation of an augmented reality display including a view of a physical computer system display and a virtual reality display of a virtual dashboard adjacent to and outside of certain features of the physical computer system display. In this regard, the augmented reality display may represent a live direct or indirect view of a physical, real-world environment, such as the physical computer system display, whose elements are augmented by the virtual reality display of the virtual dashboard. In this regard, the virtual reality display may represent a computer-generated display of a virtual environment (e.g., the virtual dashboard).

As disclosed herein, a computer system display may include a monitor or another type of device that is used to display information. The computer system display may include a display screen, electronic circuitry, a housing, and a power supply unit (PSU). An example of a computer system display includes a thin film transistor liquid crystal display (TFT-LCD) with light-emitting diode (LED) backlighting. The display screen may define the maximum dimensions of a display area that may be used to display content. When content is being displayed using the entire display area, in order to display additional content, a size of the display area being used for the original content may need to be reduced and/or the additional content may be overlaid on the original content. This type of modification to the display area may interrupt user interaction with the original content. In this regard, when additional content needs to be displayed, it is technically challenging to maintain uninterrupted user interaction with the original content being displayed using the entire display area.

The apparatuses, methods, and non-transitory computer readable media disclosed herein address at least the aforementioned technical challenges by generating, for an augmented reality device, an augmented reality display that includes a view of the computer system display and further includes a virtual reality display of a virtual dashboard adjacent to and outside of certain features of the computer system display. In this regard, the computer system display may be designated as a physical computer system display. The features of the computer system display may include physical boundaries (e.g., outer edge of a display bezel) of the computer system display and/or boundaries of a viewing area of the computer system display. The features may be used to determine boundaries and/or dimensions of the virtual dashboard. Further, original content displayed on the computer system display may be used to generate further content to be displayed on the virtual dashboard. Accordingly, user interaction with the original content being displayed using the entire display area (e.g., viewing area) of the computer system display may remain uninterrupted.

The apparatuses, methods, and non-transitory computer readable media disclosed herein may provide for increased mobility with the implementation of an augmented reality display that includes a view of a computer system display and further includes a virtual reality display of a virtual dashboard adjacent to and outside of certain features of the computer system display.

The apparatuses, methods, and non-transitory computer readable media disclosed herein may provide for implementation of multiple displays (e.g., virtual dashboards and/or virtual monitors) without the need to add physical monitors and cables.

The apparatuses, methods, and non-transitory computer readable media disclosed herein may provide for added control over a user interface by entirely (or selectively) filtering out background (e.g., removing an office background, a warehouse background, an outdoors background, etc.), customizing a background (e.g., modifying background colors, patterns, etc.), and/or adding an immersive background (e.g., adding an office background for immersion of a user into an office environment).

The apparatuses, methods, and non-transitory computer readable media disclosed herein may facilitate interaction with a user interface (e.g., a user interface on a virtual dashboard) without the need to toggle between applications.

The apparatuses, methods, and non-transitory computer readable media disclosed herein may provide a user with the ability to focus on an application and/or a game by adding controls and displays outside of the application and/or the game so that the user has visibility to other applications and/or games during operation of the application and/or game without occupying a primary display (e.g., a physical computer system display).

The apparatuses, methods, and non-transitory computer readable media disclosed herein may provide for reduction in eye strain that may result from prolonged staring at a physical computer system display by filtering out specific colors, light intensities, etc., from the physical computer system display. These aspects may provide for reduction in eye strain and/or increase in eye safety.

The apparatuses, methods, and non-transitory computer readable media disclosed herein may provide for added privacy as content displayed on a virtual dashboard and/or a virtual monitor may be made visible to a user, without being visible to unauthorized individuals.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of an augmented reality based virtual dashboard implementation apparatus (hereinafter also referred to as "apparatus 100").

Referring to FIG. 1, the apparatus 100 may include a feature identification module 102 to identify features 104 of a physical computer system display 106. According to examples, the identified features 104 of the physical computer system display 106 may include an outer edge of a display bezel of the physical computer system display 106. In addition, or in other examples, the identified features 104 of the physical computer system display 106 may include boundaries of a viewing area of the physical computer system display 106.

A boundary determination module 108 may determine, based on the identified features 104 of the physical computer system display 106, boundaries 110 of a virtual dashboard 112. The virtual dashboard 112 may be selectably created, viewed, and/or modified by a user of a computer system or another device that operates the physical computer system display 106. Further, the user may interact with the physical computer system display 106 and/or the virtual dashboard 112. For example, the user may display, modify, and/or otherwise interact with content of the physical computer system display 106 and/or the virtual dashboard 112, and/or any attributes of the physical computer system display 106 and/or the virtual dashboard 112. The attributes may include a display size, an overall size including borders, lighting, location, orientation, etc., with respect to the physical computer system display 106 and/or the virtual dashboard 112.

According to examples, the boundaries 110 may be determined by determining, as the features 104, boundaries of a viewing area of the physical computer system display 106 by identifying a plurality of display boundary indicators provided on the physical computer system display 106, and determining, based on the identified display boundary indicators, the boundaries 110 of the virtual dashboard 112. According to examples, the display boundary indicators may include coloured symbols, infrared symbols, and/or ultraviolet symbols provided on the physical computer system display 106.

According to examples, a boundary of the boundaries 110 may be determined by determining, as the features 104, edges of the physical computer system display 106 by identifying a plurality of display boundary indicators provided on the physical computer system display 106, and determining, based on the identified display boundary indicators, the boundary of the boundaries 110 of the virtual dashboard 112. In this regard, the display boundary indicators may be used to locate the edges of the physical computer system display 106, and then a common edge of the located edges may be used to display the virtual dashboard 112.

According to examples, the boundaries 110 may be determined by determining, as the features 104, boundaries of a viewing area of the physical computer system display 106 by identifying peripheral device (e.g., mouse) scroll limits associated with the physical computer system display 106, and determining, based on the identified peripheral device scroll limits, the boundaries 110 of the virtual dashboard 112. In this regard, the scroll limits may represent locking of movements of a peripheral device with respect to the physical computer system display 106. Further, once the virtual dashboard 112 is displayed, movements of a peripheral device may be unlocked with respect to the virtual dashboard 112 so that the peripheral device may be used for the physical computer system display 106 and/or the virtual dashboard 112.

According to examples, the boundaries 110 may be determined by determining, as the features 104, boundaries of a viewing area of the physical computer system display 106 by detecting user eye movements directed to edges of the physical computer system display 106, and determining, based on the detected user eye movements, the boundaries 110 of the virtual dashboard 112. In this regard, camera tracking inside an augmented reality device as disclosed herein may be used to detect a user's eye movement to determine the edges of the physical computer system display 106. The camera tracking may be performed by prompting a user to look, for example, at the four corners (e.g., a type of distinct "training mode") of the physical computer system display 106 or may also be extrapolated by analyzing a user interaction with an application and/or playing of a game (e.g., over time).

An augmented reality display generation module 114 may generate, for an augmented reality device 116 and based on the determined boundaries 110 of the virtual dashboard 112, an augmented reality display 118 that includes a view of the physical computer system display 106 and further includes a virtual reality display of the virtual dashboard 112 (e.g., as disclosed in further detail with reference to FIG. 2) adjacent to and outside of the identified features 104 of the physical computer system display 106. According to examples, the augmented reality device 116 may include augmented reality glasses, or generally, any type of device capable of displaying an augmented reality display 118.

Figure 3:
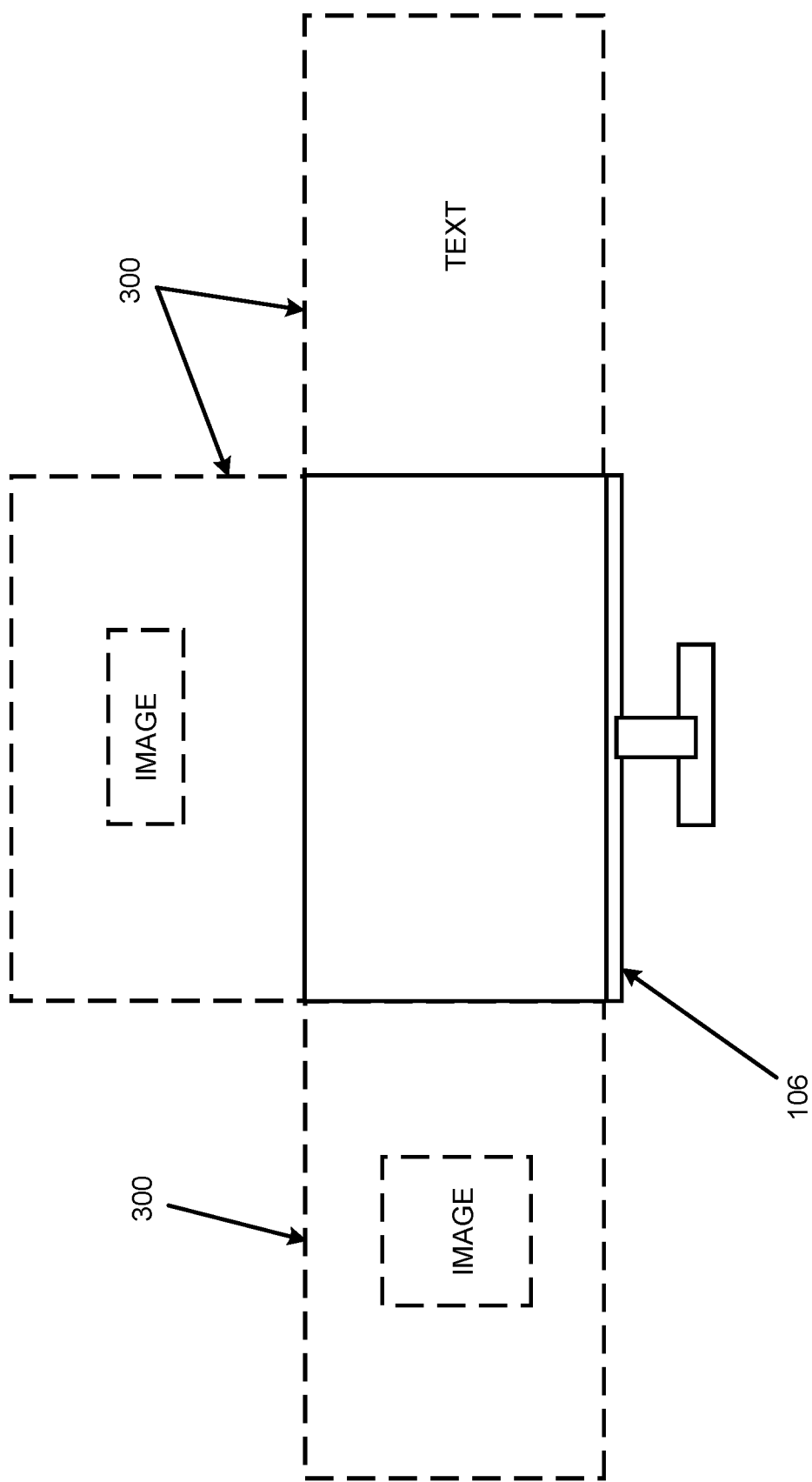
FIG. 3 illustrates an example layout of an augmented reality display including a view of a physical computer system display and a virtual reality display of virtual monitors to illustrate operation of the augmented reality based virtual dashboard implementation apparatus of FIG. 1.

In addition, or in other examples, as disclosed in further detail with reference to FIG. 3, the augmented reality display 118 may include a further virtual reality display of a virtual monitor adjacent to the physical computer system display 106.

According to examples, the augmented reality device 116 may be used by the feature identification module 102 to identify the features 104 of the physical computer system display 106.

According to examples, the augmented reality display 118 may locate and/or otherwise orient the view of the physical computer system display 106 and/or the virtual reality display of the virtual dashboard 112 (and/or the virtual monitor) by determining a location and/or orientation of the physical computer system display 106 and displaying the virtual reality display of the virtual dashboard 112 (and/or the virtual monitor) adjacent to the display of the physical computer system display 106. In this regard, certain features of the view of the physical computer system display 106 and/or the virtual dashboard 112 may be entered by a user of the apparatus 100, or otherwise ascertained. For example, a screen size for the physical computer system display 106, desired border size for the virtual dashboard 112, preset locations of the virtual dashboard 112 relative to the physical computer system display 106, etc., may be entered by a user of the apparatus 100, and/or otherwise ascertained.

According to examples, the augmented reality display generation module 114 may provide for customization of borders of the virtual dashboard 112 and/or the virtual monitor. For example, the augmented reality display generation module 114 may provide for customization of borders to include themed borders, application based borders, game based borders, and/or user selectable borders. For example, the borders may include a nature theme, a location-based theme, etc. Similarly, a user may select a border from a list of predetermined borders, and/or may otherwise customize the border to include different colors, patterns, etc.

A content generation module 120 may generate content 122 to be displayed on the virtual dashboard 112. Further, the content generation module 120 may cause the content 122 to be displayed on the virtual dashboard 112.

According to examples, the content 122 may represent virtual dashboard content. In this regard, the content generation module 120 may identify physical computer system display content 124 displayed on the physical computer system display 106. Further, the content generation module 120 may generate, based on the identified physical computer system display content 124, the virtual dashboard content (e.g., the content 122) to be displayed on the virtual dashboard 112.

According to examples, the content generation module 120 may implement character recognition to identify characters displayed on the physical computer system display 106. In this regard, the content generation module 120 may analyze the identified characters to determine the physical computer system display content 124 displayed on the physical computer system display 106. Further, a language associated with the identified characters may be translated to a user-specified language. For example, assuming that the physical computer system display content 124 is in Japanese based on a Japanese language application, in this regard, the Japanese language physical computer system display content 124 may be translated to a user specified language such as English, etc., and displayed (e.g., overwritten, or separately displayed in the virtual dashboard 112) accordingly by the augmented reality device 116.

According to examples, the content 122 may include any type of information such as a clock display, music-related display, a notification, a web browser, a control panel, gaming display and/or information, a video, application related images, game related images, etc. For example, the notifications may include in-game and/or in-application information that represent information related to the physical computer system display content 124, and/or out-of-game or out-of-application information such as a phone call, etc. The gaming display and/or information may include any type of walk-through guide, tutorial, blog, forum, etc. The gaming related images may include any type of display of characters from a game that is being played on the physical computer system display 106.

Figure 2:
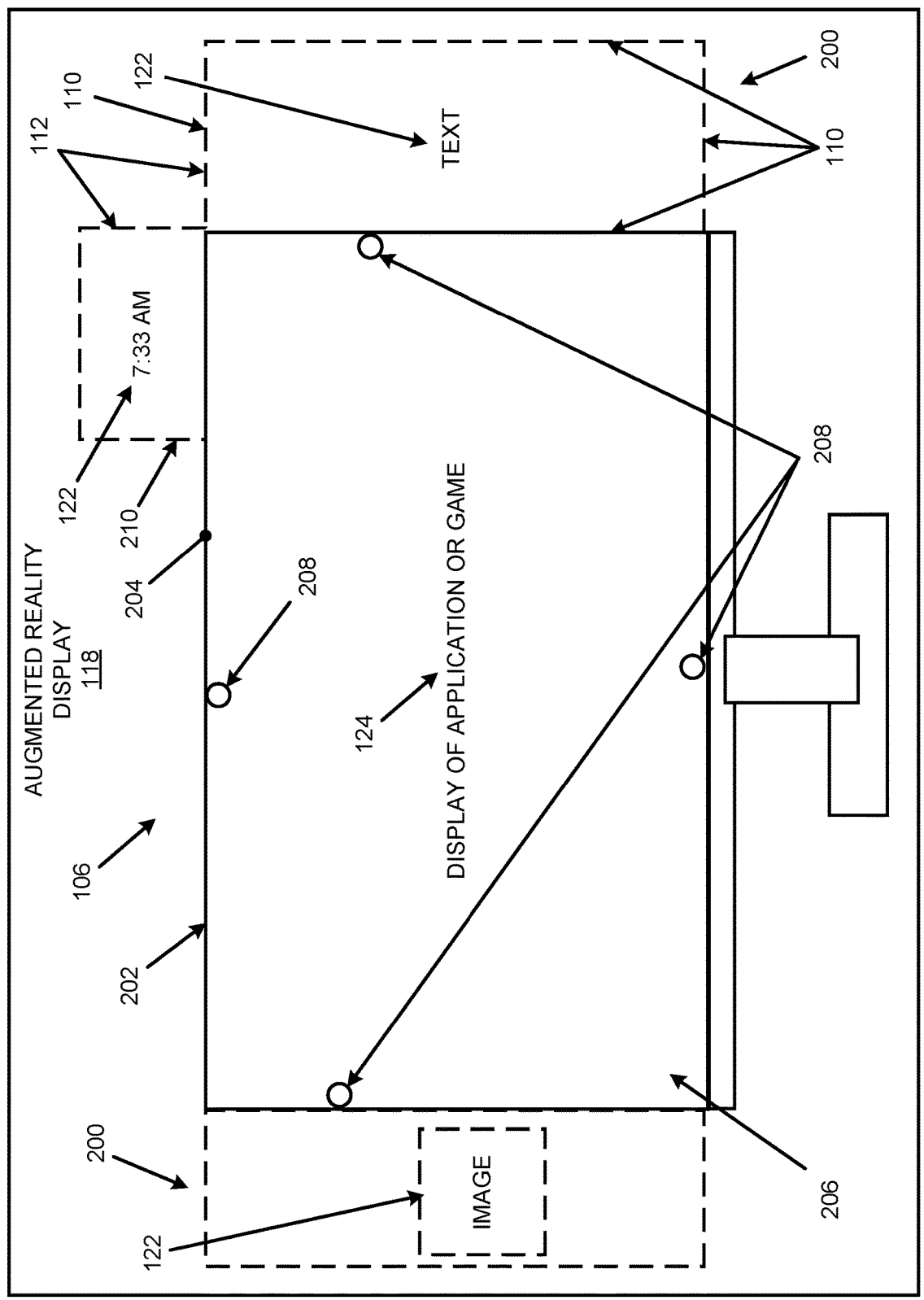
FIG. 2 illustrates an example layout of an augmented reality display including a view of a physical computer system display and a virtual reality display of a virtual dashboard to illustrate operation of the augmented reality based virtual dashboard implementation apparatus of FIG. 1.

FIG. 2 illustrates an example layout of an augmented reality display 118 including a view of a physical computer system display 106 and a virtual reality display 200 of a virtual dashboard 112 to illustrate operation of the apparatus 100.

Referring to FIG. 2, as disclosed herein, the feature identification module 102 may identify features 104 of the physical computer system display 106. According to examples, the identified features 104 of the physical computer system display 106 may include an outer edge 202 of a display bezel 204 of the physical computer system display 106. The display bezel 204 may represent a physical electronic or non-electronic component attached to outer edges of a viewing area 206 as shown in FIG. 2. In addition, or in other examples, the display bezel 204 may represent outer edges of the viewing area 206 if a physical electronic or non-electronic component is not attached to outer edges of the viewing area 206.

In addition, or in other examples, the identified features 104 of the physical computer system display 106 may include boundaries of the viewing area 206 of the physical computer system display 106. In this regard, the boundaries of the viewing area 206 of the physical computer system display 106 may be defined by inner edges of the display bezel 204 of the physical computer system display 106 (e.g., for a display bezel that includes a physical electronic or non-electronic component). In addition, or in other examples, the boundaries of the viewing area 206 of the physical computer system display 106 may be defined by an area of the physical computer system display 106 which includes the capability of selectably displaying content.

The virtual dashboard 112 may be displayed, as shown in FIG. 2, adjacent to outer edges of the display bezel 204 of the physical computer system display 106. In the example of FIG. 2, the virtual dashboard may include virtual dashboard displays on left and right sides (in the orientation of FIG. 2) of the physical computer system display 106. In addition, or in other examples, in the example of FIG. 2, the virtual dashboard may include a virtual dashboard clock display 210 on a top side (in the orientation of FIG. 2) of the physical computer system display 106.

As disclosed herein, the boundary determination module 108 may determine, based on the identified features 104 of the physical computer system display 106, the boundaries 110 of the virtual dashboard 112. For example, as shown in FIG. 2, the boundaries 110 may be determined by determining, as the features 104, boundaries of the viewing area 206 of the physical computer system display 106 by identifying a plurality of display boundary indicators 208 provided on the physical computer system display 106, and determining, based on the identified display boundary indicators 208, the boundaries 110 of the virtual dashboard 112. According to examples, the display boundary indicators 208 may include coloured symbols, infrared symbols, and/or ultraviolet symbols provided on the physical computer system display 106. In the example of FIG. 2, the display boundary indicators 208 are shown to include a circular format. However, the display boundary indicators 208 may include any format suitable for determining the boundaries 110 of the virtual dashboard 112. For example, the display boundary indicators 208 may include "green dots" on edges of the physical computer system display 106 that the augmented reality device 116 may recognize to detect the physical boundaries of the physical computer system display 106 for generation of the virtual dashboard 112 around the physical computer system display 106. The display boundary indicators 208 may be positioned at the corners of the viewing area in an example.

As disclosed herein, the boundaries 110 may be determined by determining, as the features 104, boundaries of the viewing area of the physical computer system display 106 by identifying peripheral device (e.g., mouse) scroll limits associated with the physical computer system display 106 and determining, based on the identified peripheral device scroll limits, the boundaries 110 of the virtual dashboard 112. In this regard, in the example of FIG. 2, the peripheral device (e.g., mouse) scroll limits may be limited to an area of the physical computer system display 106 which includes the capability of selectably displaying content. For example, the viewing area 206 may represent an area of the physical computer system display 106 which includes the capability of selectably displaying content.

As disclosed herein, the boundaries 110 may be determined by determining, as the features 104, boundaries of a viewing area of the physical computer system display 106 by detecting user eye movements directed to edges of the physical computer system display 106, and determining, based on the detected user eye movements, the boundaries 110 of the virtual dashboard 112. In this regard, in the example of FIG. 2, user eye movements may be directed to outer edges along the viewing area 206. In addition, or in other examples, user eye movements may be directed to outer edges along the display bezel 204. This user eye movement may be used to determine the boundaries 110 by utilizing the user eye movements to determine edges along which the virtual dashboard 112 may be located, and maximum boundaries and/or dimensions of the virtual dashboard 112.

As disclosed herein, the content generation module 120 may generate the content 122 to be displayed on the virtual dashboard 112. Further, the content generation module 120 may cause the content 122 to be displayed on the virtual dashboard 112. According to examples, the content 122 may represent virtual dashboard content. In this regard, the content generation module 120 may identify physical computer system display content 124 displayed on the physical computer system display 106. Further, the content generation module 120 may generate, based on the identified physical computer system display content 124, the virtual dashboard content (e.g., the content 122) to be displayed on the virtual dashboard 112. For the example of FIG. 2, the physical computer system display content 124 for a computer game may include "OVERTIME", and based on the physical computer system display content 124, the virtual dashboard content (e.g., the content 122) may include information related to "overtime" activities related to the computer game. For example, the content generation module 120 may implement character recognition to identify characters displayed on the physical computer system display 106. In this regard, the content generation module 120 may analyze the identified characters that include "OVERTIME" to determine the physical computer system display content 124 displayed on the physical computer system display 106.

FIG. 3 illustrates an example layout of an augmented reality display 118 including a view of a physical computer system display 106 and a virtual reality display of virtual monitors to illustrate operation of the apparatus 100.

Referring to FIG. 3, as disclosed herein, the augmented reality display 118 may include a virtual reality display of a virtual monitor 300 adjacent to the physical computer system display 106. In this regard, in the example of FIG. 3, the augmented reality display 118 may include a virtual reality display of three virtual monitors adjacent to the physical computer system display 106.

Figure 4:
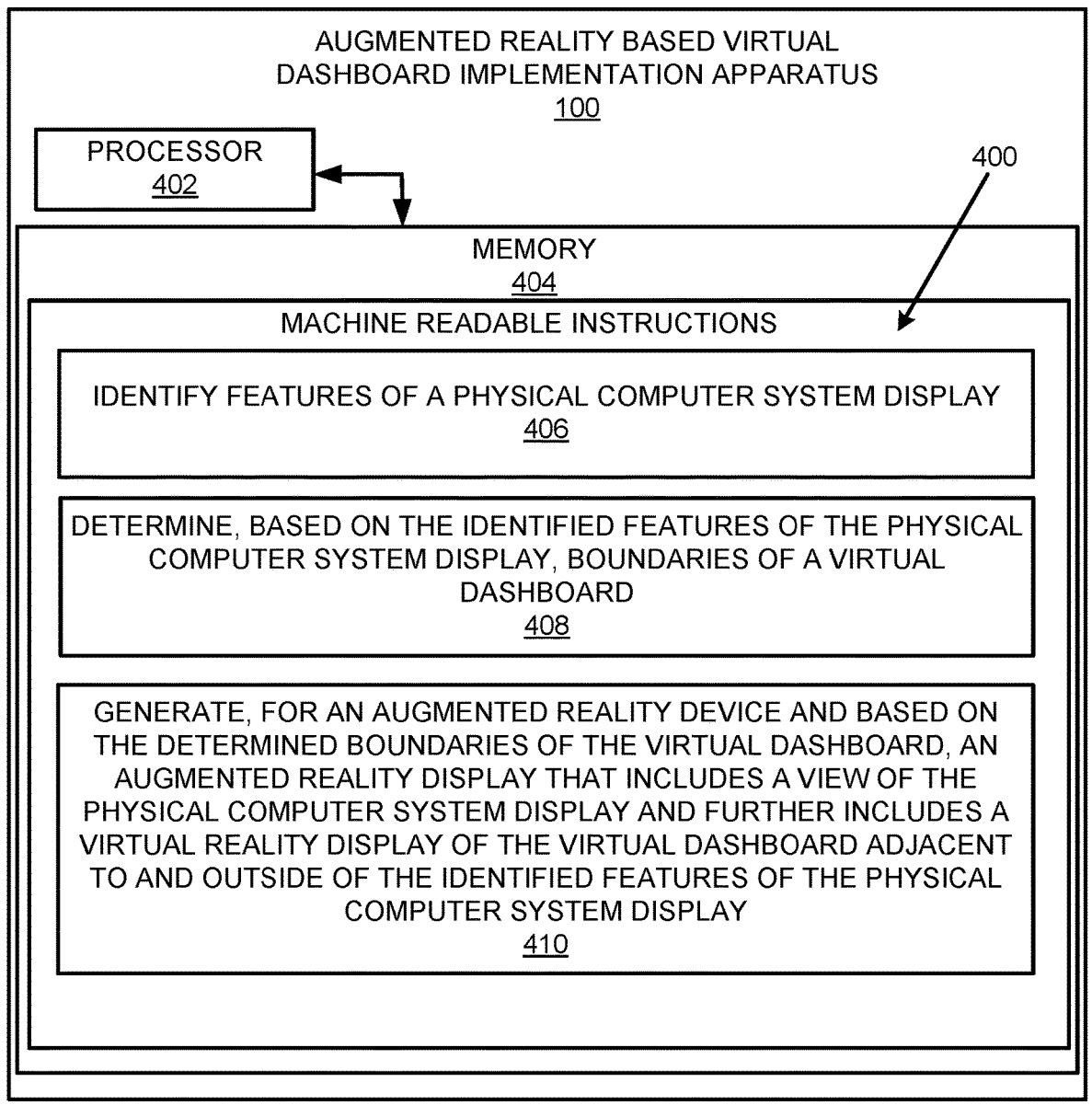
FIG. 4 illustrates an example block diagram for augmented reality based virtual dashboard implementation.
Figure 6:
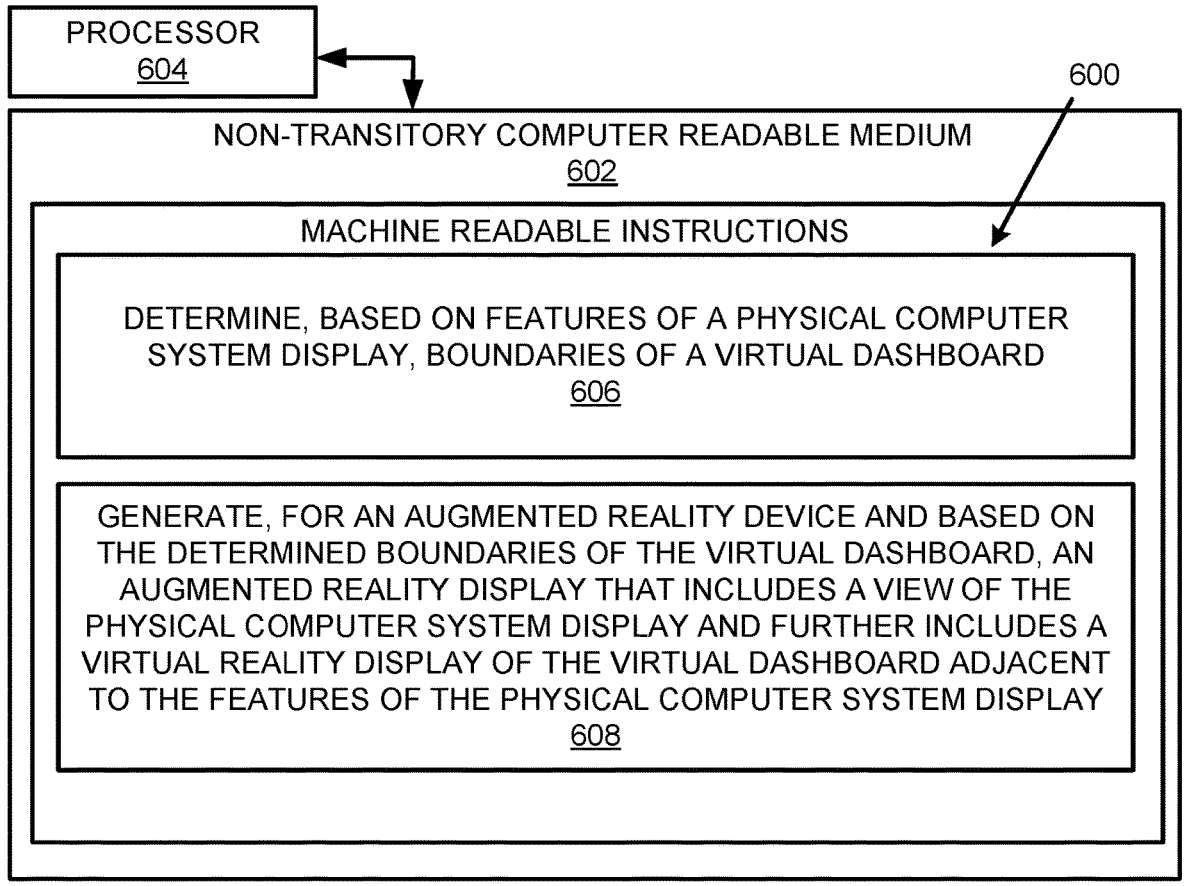
FIG. 6 illustrates a further example block diagram for augmented reality based virtual dashboard implementation.

FIGS. 4-6 respectively illustrate an example block diagram 400, an example flowchart of a method 500, and a further example block diagram 600 for augmented reality based virtual dashboard implementation. The block diagram 400, the method 500, and the block diagram 600 may be implemented on the apparatus 100 described above with reference to FIG. 1 by way of example and not limitation. The block diagram 400, the method 500, and the block diagram 600 may be practiced in other apparatus. In addition to showing the block diagram 400, FIG. 4 shows hardware of the apparatus 100 that may execute the instructions of the block diagram 400. The hardware may include a processor 402, and a memory 404 (i.e., a non-transitory computer readable medium) storing machine readable instructions that when executed by the processor 402 cause the processor to perform the instructions of the block diagram 400. The memory 404 may represent a non-transitory computer readable medium. FIG. 5 may represent a method for augmented reality based virtual dashboard implementation, and the steps of the method. FIG. 6 may represent a non-transitory computer readable medium 602 having stored thereon machine readable instructions to provide augmented reality based virtual dashboard implementation. The machine readable instructions, when executed, cause a processor 604 to perform the instructions of the block diagram 600 also shown in FIG. 6.

The processor 402 of FIG. 4 and/or the processor 604 of FIG. 6 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 602 of FIG. 6), such as hardware storage devices (e.g., RAM (random access memory), ROM (read only memory), EPROM (erasable, programmable ROM), EEPROM (electrically erasable, programmable ROM), hard drives, and flash memory). The memory 404 may include a RAM, where the machine readable instructions and data for a processor may reside during runtime.

Referring to FIGS. 1-4, and particularly to the block diagram 400 shown in FIG. 4, the memory 404 may include instructions 406 to identify features 104 of a physical computer system display 106.

The processor 402 may fetch, decode, and execute the instructions 408 to determine, based on the identified features 104 of the physical computer system display 106, boundaries 110 of a virtual dashboard 112.

The processor 402 may fetch, decode, and execute the instructions 410 to generate, for an augmented reality device 116 and based on the determined boundaries 110 of the virtual dashboard 112, an augmented reality display 118 that includes a view of the physical computer system display 106, and further includes a virtual reality display of the virtual dashboard 112 adjacent to and outside of the identified features 104 of the physical computer system display 106. The virtual dashboard 112 may include content (e.g., the content 122) displayed thereon.

Referring to FIGS. 1-3 and 5, and particularly FIG. 5, for the method 500, at block 502, the method may include identifying features 104 of a physical computer system display 106.

At block 504 the method may include determining, based on the identified features 104 of the physical computer system display 106, boundaries 110 of a virtual dashboard 112.

At block 506 the method may include generating, for an augmented reality device 116 and based on the determined boundaries 110 of the virtual dashboard 112, an augmented reality display 118 that includes a view of the physical computer system display 106, a virtual reality display of the virtual dashboard 112 adjacent to and outside of the identified features 104 of the physical computer system display 106, and a further virtual reality display of a virtual monitor adjacent to the physical computer system display 106. The virtual dashboard 112 or the virtual monitor may include content (e.g., the content 122) displayed thereon.

Referring to FIGS. 1-3 and 6, and particularly FIG. 6, for the block diagram 600, the non-transitory computer readable medium 602 may include instructions 606 to determine, based on features 104 of a physical computer system display 106, boundaries 110 of a virtual dashboard 112.

The processor 604 may fetch, decode, and execute the instructions 608 to generate, for an augmented reality device 116 and based on the determined boundaries 110 of the virtual dashboard 112, an augmented reality display 118 that includes a view of the physical computer system display 106, and further includes a virtual reality display of the virtual dashboard 112 adjacent to the features 104 of the physical computer system display 106. The virtual dashboard 112 may include content (e.g., the content 122) displayed thereon.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing machine readable instructions that when executed by the processor cause the processor to:
      identify features of a physical computer system display;
      determine, based on the identified features that include boundaries of a viewing area of the physical computer system display, boundaries of a virtual dashboard by
         determining, as e features, the boundaries of the viewing area of the physical computer system display by detecting user eye movements directed to edges of the physical computer system display, and
         determining, based on the detected user eye movements, the boundaries of the virtual dashboard; and
      generate, for an augmented reality device and based on the determined boundaries of the virtual dashboard, an augmented reality display that
         includes a view of the physical computer system display, and
         further includes a virtual reality display of the virtual dashboard adjacent to and outside of the identified features of the physical computer system display, wherein the virtual dashboard is to include content displayed thereon.

2. The apparatus according to claim 1, wherein the content represents virtual dashboard content, further comprising machine readable instructions that when executed by the processor further cause the processor to:
   identify physical computer system display content displayed on the physical computer system display; and
   generate, based on the identified physical computer system display content, the virtual dashboard content to be displayed on the virtual dashboard.

3. The apparatus according to claim 2, wherein the instructions to identify the physical computer system display content displayed on the physical computer system display are further to cause the processor to:
   implement character recognition to identify characters displayed on the physical computer system display; and
   analyze the identified characters to determine the physical computer system display content displayed on the physical computer system display.

4. The apparatus according to claim 1, wherein the instructions to generate, for the augmented reality device and based on the determined boundaries of the virtual dashboard, the augmented reality display that includes the view of the physical computer system display, and further includes the virtual reality display of the virtual dashboard adjacent to and outside of the identified features of the physical computer system display are further to cause the processor to:
   generate, for the augmented reality device, the augmented reality display that further includes a further virtual reality display of a virtual monitor adjacent to the physical computer system display.

5. The apparatus according to claim 1, wherein the identified features of the physical computer system display include an outer edge of a display bezel of the physical computer system display.

6. The apparatus according to claim 1, wherein the instructions to identify the features of the physical computer system display and determine, based on the identified features of the physical computer system display, the boundaries of the virtual dashboard are further to cause the processor to:
   determine, as the features, the boundaries of the viewing area of the physical computer system display by identifying a plurality of display boundary indicators provided on the physical computer system display; and
   determine, based on the identified display boundary indicators, the boundaries of the virtual dashboard.

7. The apparatus according to claim 6, wherein the display boundary indicators include at least one of coloured symbols, infrared symbols, or ultraviolet symbols, provided on the physical computer system display.

8. The apparatus according to claim 6, wherein the instructions to identify the features of the physical computer system display and determine, based on the identified features of the physical computer system display, the boundaries of the virtual dashboard are further to cause the processor to:

determine, as the features, the boundaries of the viewing area of the physical computer system display by identifying peripheral device scroll limits associated with the physical computer system display; and determine, based on the identified peripheral device scroll limits, the boundaries of the virtual dashboard.

9. A computer implemented method comprising:

identifying features that include boundaries of a viewing area of a physical computer system display;

determining, based on the identified features of the physical computer system display, boundaries of a virtual dashboard by determining, as the features, boundaries of the viewing area of the physical computer system display by detecting user eye movements directed to edges of the physical computer system display, and determining, based on the detected user eye movements, the boundaries of the virtual dashboard; and generating, for an augmented reality device and based on the determined boundaries of the virtual dashboard, an augmented reality display that includes a view of the physical computer system display, a virtual reality display of the virtual dashboard adjacent to and outside of the identified features of the physical computer system display, and a further virtual reality display of a virtual monitor adjacent to the physical computer system display, wherein the virtual dashboard or the virtual monitor is to include content displayed thereon.

10. The method according to claim 9, wherein identifying the features of the physical computer system display and determining, based on the identified features of the physical computer system display, the boundaries of the virtual dashboard further comprise:

determining, as the features, the boundaries of the viewing area of the physical computer system display by identifying a plurality of display boundary indicators provided on the physical computer system display; and determining, based on the identified display boundary indicators, the boundaries of the virtual dashboard.

11. A non-transitory computer readable medium having stored thereon machine readable instructions, the machine readable instructions, when executed, cause a processor to:

determine, based on features that include boundaries of a viewing area of a physical computer system display, boundaries of a virtual dashboard by determining, as the features, the boundaries of the viewing area of the physical computer system display by detecting user eye movements directed to edges of the physical computer system display, and determining, based on the detected user eye movements, the boundaries of the virtual dashboard; and generate, for an augmented reality device and based on the determined boundaries of the virtual dashboard, an augmented reality display that includes a view of the physical computer system display, and further includes a virtual reality display of the virtual dashboard adjacent to the features of the physical computer system display, wherein the virtual dashboard is to include content displayed thereon.

12. The non-transitory computer readable medium according to claim 11, wherein the machine readable instructions to determine, based on the features of the physical computer system display, the boundaries of the virtual dashboard, when executed, further cause the processor to:

determine, as the features, the boundaries of the viewing area of the physical computer system display by identifying peripheral device scroll limits associated with the physical computer system display; and determine, based on the identified peripheral device scroll limits, the boundaries of the virtual dashboard.

* * * * *